(12) United States Patent
Chen

(10) Patent No.: US 9,930,962 B2
(45) Date of Patent: Apr. 3, 2018

(54) SIDE-LOCKING SLIDING RAIL ASSEMBLY HAVING AN AUTO-OPENING MECHANISM

(71) Applicant: GSLIDE CORPORATION, New Taipei (TW)

(72) Inventor: Yung-Liang Chen, Taipei Shien (TW)

(73) Assignee: GSLIDE CORPORATION, New Taipei (TW)

( * ) Notice: Subject to any disclaimer, the term of this patent is extended or adjusted under 35 U.S.C. 154(b) by 93 days.

(21) Appl. No.: 15/272,730

(22) Filed: Sep. 22, 2016

(65) Prior Publication Data

US 2017/0086583 A1 Mar. 30, 2017

(30) Foreign Application Priority Data

Sep. 25, 2015 (TW) .............................. 104131741 A

(51) Int. Cl.
| | |
|---|---|
| *A47B 95/00* | (2006.01) |
| *A47B 88/04* | (2006.01) |
| *F16C 29/10* | (2006.01) |
| *A47B 88/463* | (2017.01) |
| *A47B 88/49* | (2017.01) |
| *A47B 88/50* | (2017.01) |

(52) U.S. Cl.
CPC ........ *A47B 88/0477* (2013.01); *A47B 88/463* (2017.01); *A47B 88/49* (2017.01); *A47B 88/50* (2017.01); *F16C 29/10* (2013.01); *F16C 2314/72* (2013.01)

(58) Field of Classification Search
CPC ... A47B 88/0477; A47B 88/49; A47B 88/463; A47B 88/50; F16C 29/10; F16C 2314/72
See application file for complete search history.

(56) References Cited

U.S. PATENT DOCUMENTS

| | | | |
|---|---|---|---|
| 7,347,515 B1 | 3/2008 | Lu | |
| 7,374,261 B1 * | 5/2008 | Wang | ................... A47B 88/463 |
| | | | 312/319.1 |
| 8,079,653 B2 * | 12/2011 | Huang | ................... F16C 29/02 |
| | | | 312/333 |

(Continued)

FOREIGN PATENT DOCUMENTS

| | | |
|---|---|---|
| TW | M 394046 U1 | 12/2010 |
| TW | M 396049 U1 | 1/2011 |

(Continued)

*Primary Examiner* — Hanh V Tran
(74) *Attorney, Agent, or Firm* — Cook Alex Ltd.

(57) ABSTRACT

A side-locking sliding rail assembly for a drawer consisting of a fixed rail, a movable rail, an intermediate rail, a sliding device, a locating member, a hook block, an actuation member, at least one first compression spring, a second compression spring and an auto-opening mechanism carrier plate. The drawer can be temporarily secured in a position, subject to engagement of a pawl of a locating rod of the locating member with one of a series of sloping teeth along the auto-opening mechanism carrier plate, if the drawer is not accurately fully closed. Thereafter, the user can apply a pressure to push the drawer backward to the fully closed position avoiding rebound toward the open position. The arrangement of a second compression spring prevents tilting of the locating member, so that the locating rod will not be permitted to move forward when in the guide-in channel.

5 Claims, 20 Drawing Sheets

(56) References Cited

U.S. PATENT DOCUMENTS

| | | | |
|---|---|---|---|
| 8,939,525 B1* | 1/2015 | Chen | A47B 88/047 |
| | | | 312/333 |
| 9,222,294 B2 | 12/2015 | Chen | |
| 9,532,648 B2* | 1/2017 | Gasser | A47B 88/0477 |
| 9,642,461 B2* | 5/2017 | Goetz | A47B 88/467 |
| 2010/0026152 A1* | 2/2010 | Huang | A47B 88/467 |
| | | | 312/319.1 |
| 2012/0001441 A1* | 1/2012 | Juan | A47B 88/463 |
| | | | 292/164 |
| 2013/0187524 A1* | 7/2013 | Chen | A47B 88/463 |
| | | | 312/319.1 |
| 2014/0021841 A1* | 1/2014 | Brunnmayr | A47B 88/0477 |
| | | | 312/319.1 |
| 2014/0312755 A1* | 10/2014 | Nuckolls | A47B 88/463 |
| | | | 312/333 |
| 2014/0352109 A1 | 12/2014 | Chen | |
| 2015/0091424 A1* | 4/2015 | Nuckolls | A47B 88/463 |
| | | | 312/319.1 |
| 2015/0108891 A1* | 4/2015 | Brunnmayr | A47B 88/0481 |
| | | | 312/319.8 |

FOREIGN PATENT DOCUMENTS

| | | |
|---|---|---|
| TW | 201444498 A | 12/2014 |
| TW | 201531265 A | 8/2015 |

\* cited by examiner

SIDE-LOCKING SLIDING RAIL ASSEMBLY HAVING AN AUTO-OPENING MECHANISM

BACKGROUND OF THE INVENTION

1. Field of the Invention

The present invention relates to side-locking sliding rail assembly technology and more particularly, a side-locking sliding rail assembly having an auto-opening mechanism, which enables the drawer to be temporarily secured in position subject to engagement of a pawl of a locating member with one of a series of sloping teeth if the drawer is not accurately closed, and thus, the user can gently apply a pressure to push the drawer back to the close position avoiding rebound of the auto-opening mechanism carrier plate.

2. Description of the Related Art

When closing a drawer that is carried on two sliding rail assemblies having an auto-opening function, if the drawer is not completely closed, the drawer will be pushed open. Taiwan Utility M396049 discloses a hidden sliding rail assembly having an auto-opening and auto-closing buffering mechanism. According to this design, if the drawer is not completely closed, the locating rod of the swing member will not be positioned in the retaining groove in the auto-opening control member, and the drawer will be pushed open by the spring member. Further, Taiwan Utility M394046 discloses an auto-opening mechanism for sliding rail assembly. According to this design, if the drawer is not completely closed, the locating axle of the rocker arm will not be positioned in the retaining hole of the retaining channel of the sliding device, and the drawer will be pushed open by the spring member.

Further, Taiwan Patent 201531265 discloses a sliding rail design for drawer, entitled "side-locking sliding rail assembly". According to this design, the guide-in channel of the auto-opening mechanism carrier plate is a curved channel having a plurality of curved sub channels therein and a plurality of grooves spaced between the front inlet and the rear outlet for receiving the locating rod of the locating member to temporarily secure the auto-opening mechanism carrier plate in place. However, this design still has the following minor drawbacks.

After a long use, the locating rod of the locating member can be damaged easily due to a large gap between each two adjacent grooves in the guide-in channel of the auto-opening mechanism carrier plate, such as when the locating rod of the locating member is forced into one of the grooves, and this problem will be more serious if the drawer at the movable rail carries a heavy load, shortening the lifespan.

When the auto-opening mechanism carrier plate slides backward to the end as the user closes the drawer, the locating rod of the locating member can fall downwards and shift its position due to a large dimensional tolerance of the pivot pin of the locating member or insufficient damping oil, causing the locating rod of the locating member to move backward in the original path (the guide-in channel) and leading to an auto-opening functional failure.

During backward movement of the intermediate rail, the rear end of the intermediate rail can strike against the front side of the hook block if the pushing force applied by the user is excessively large, causing the hook block to deflect or to tilt, leading to hook block damage.

SUMMARY

The present disclosure seeks to address disadvantages in the existing prior art. It is therefore the main object of the present disclosure to provide a side-locking sliding rail assembly having an auto-opening mechanism, which enables a pawl of a locating rod of a locating member to be forced by a second compression spring into engagement with one of a series of sloping teeth to prohibit the drawer from being forced outwards by the elastic potential energy or restoring force of at least one first compression spring if the drawer does not reach the closed position when the user pushes the drawer backward from the open position toward the closed position, thus, a drawer that is not initially closed completely can be accurately closed when thereafter, the user gently applies a pressure to push the drawer backward to the closed position, assuring positive auto-opening functioning.

It is another object of the present disclosure to provide a side-locking sliding rail assembly having an auto-opening mechanism, which provides a small tooth pitch design for the sloping teeth of the auto-opening mechanism carrier plate to prevent component damage upon impact between the locating rod of the locating member and the auto-opening mechanism carrier plate, thereby prolonging the lifespan of the auto-opening mechanism.

It is still another object of the present disclosure to provide a side-locking sliding rail assembly having an auto-opening mechanism that assures positive auto-opening functioning by preventing the locating rod of the locating member from falling downward and moving to an unlatched position due to a large component dimensional tolerance or insufficient damping oil, when the drawer is not closed completely.

To achieve these and other objects, the present disclosure provides a side-locking sliding rail assembly for a drawer comprising a fixed rail, a movable rail, an intermediate rail, a sliding device, a locating member, a hook block, an actuation member, at least one first compression spring, a second compression spring and an auto-opening mechanism carrier plate. The drawer can be temporarily secured in a position that is less than fully closed, subject to engagement of a pawl of a locating rod of a locating member with at least one of a series of sloping teeth along an auto-opening mechanism carrier plate, if the drawer is not accurately closed. Thereafter, the user can gently apply a pressure to push the drawer backward to the closed position, avoiding inadvertent rebound relative to the auto-opening mechanism carrier plate under the force of the at least one first compression spring.

The small tooth pitch of the sloping teeth of the auto-opening mechanism carrier plate avoids component damage due to impact between the locating member and the auto-opening mechanism carrier plate, promoting a longer lifespan. The arrangement of a second compression spring prevents shifting of the locating member away from a temporarily held position when the sliding device is moved backward with the drawer relative to the auto-opening mechanism carrier plate. Thus, the locating rod will not be forced back toward free movement within the guide-in channel or fall downward due to a large dimensional tolerance of the second pivot pin of the locating member or insufficient damping oil. The second compression spring will bias or force the pawl of the locating rod of the locating member into engagement with at least one tooth of the sloping teeth, permitting the drawer to thereafter be pushed to a closed position to assure positive auto-opening functioning.

DETAILED DESCRIPTION OF THE INVENTION

Figure 1:
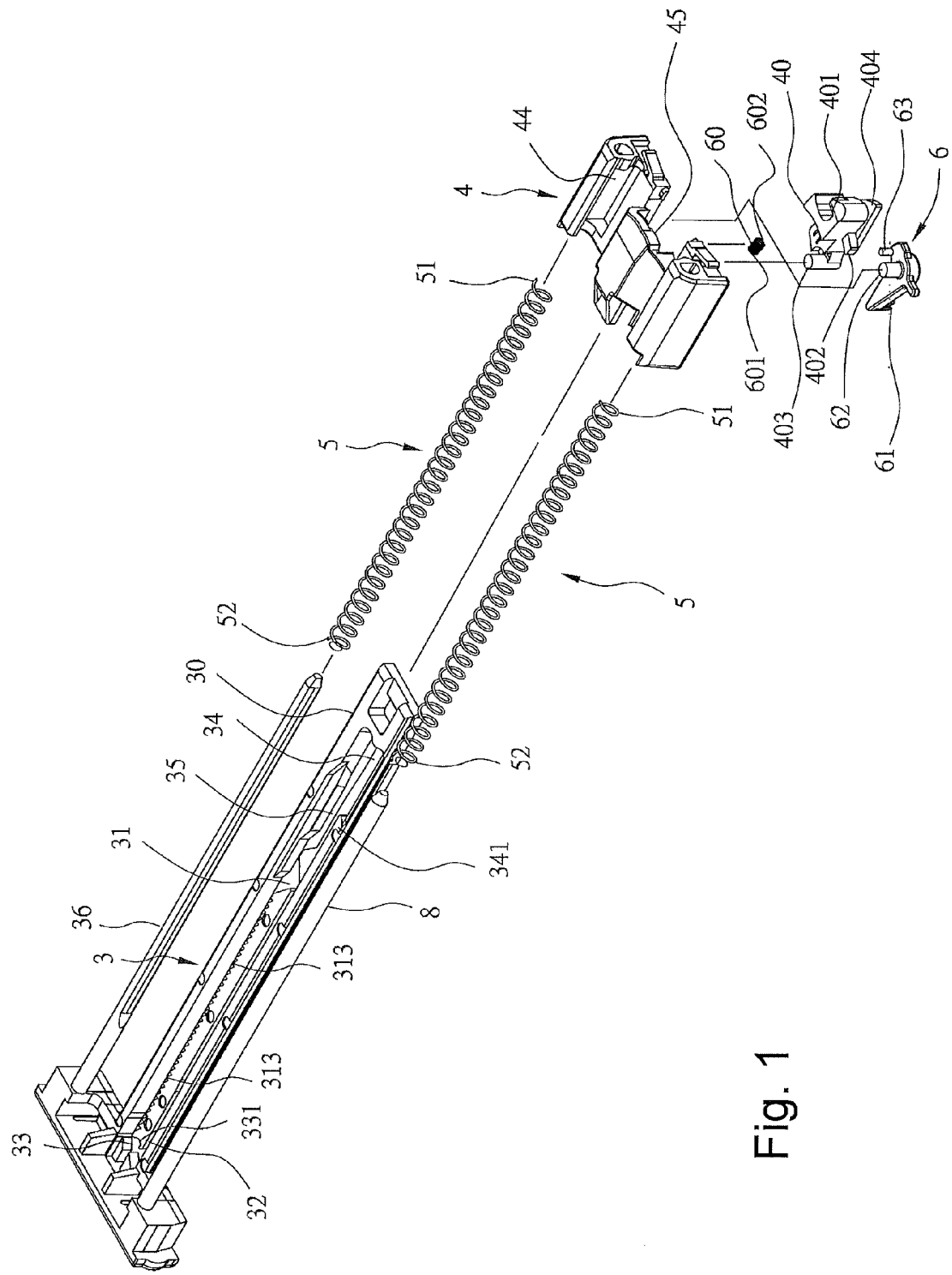
FIG. 1 is an exploded view of an auto-opening mechanism of a side-locking sliding rail assembly in accordance with the present disclosure.
Figure 12:
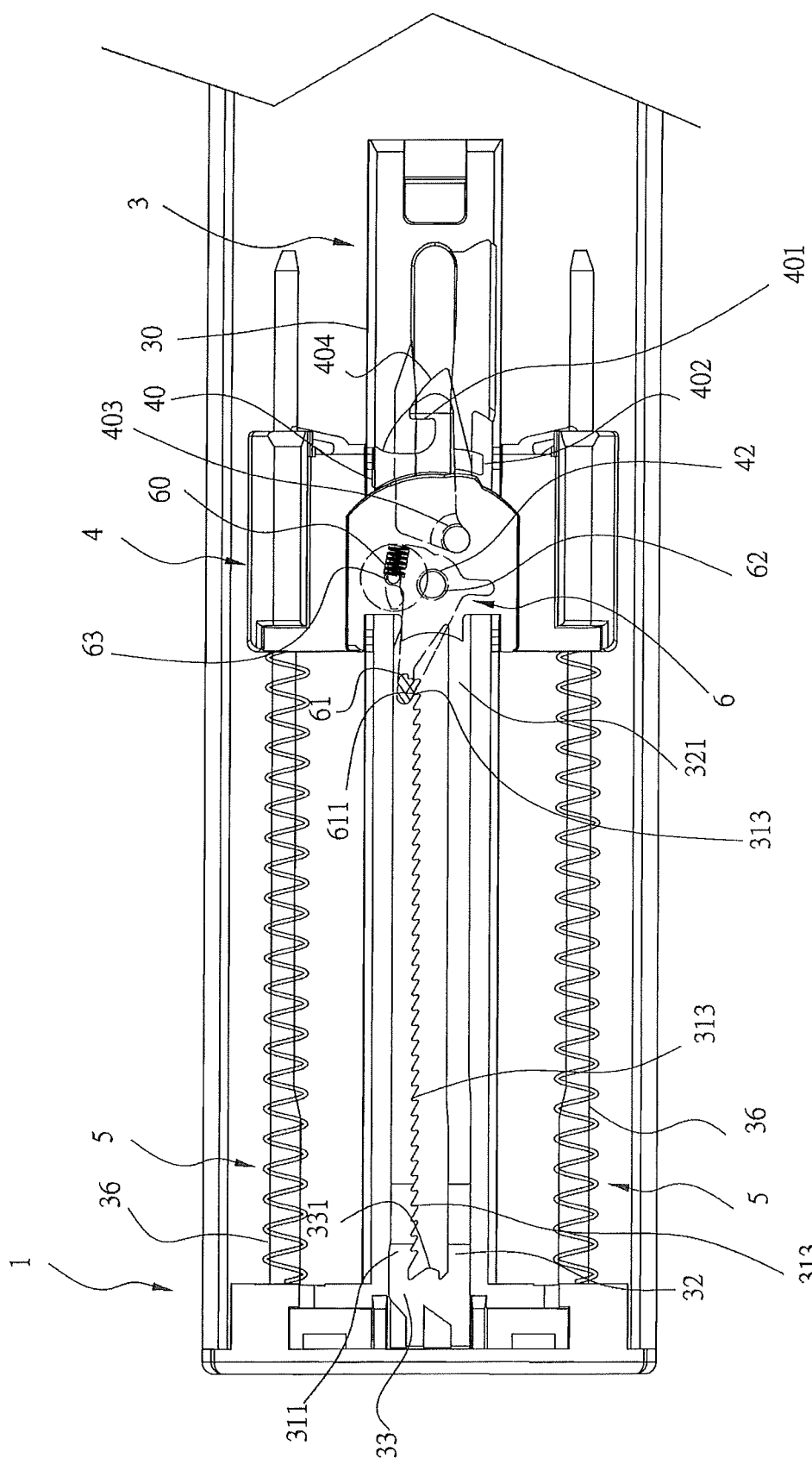
FIG. 12 is a schematic plan view, in an enlarged scale, illustrating the relationship between the pawl of the locating rod of the locating member and the sloping teeth before engagement (the intermediate rail and the fixed rail not shown).
Figure 13:
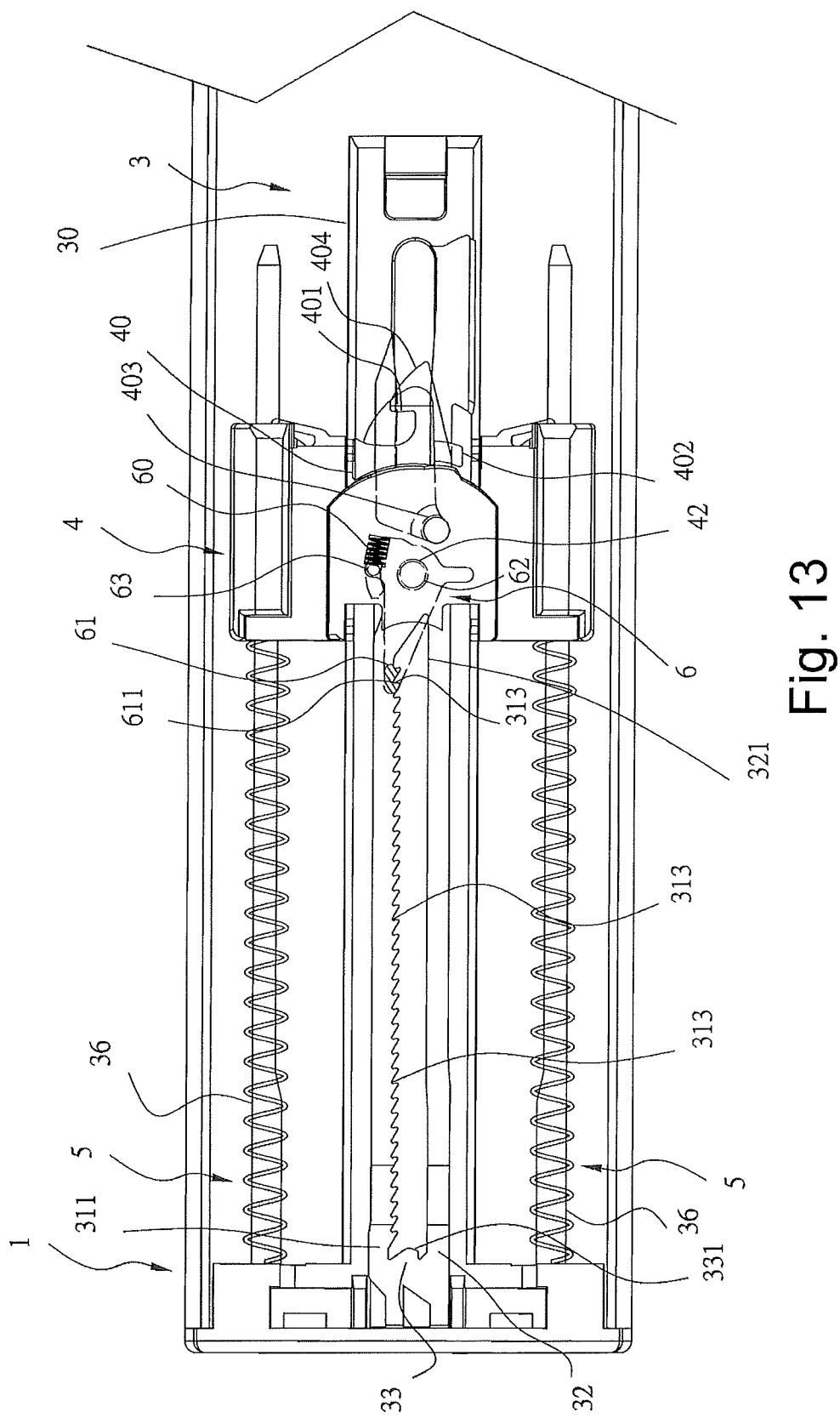
FIG. 13 is a schematic plan view, in an enlarged scale, illustrating the pawl of the locating rod of the locating member engaged with one of the sloping teeth.
Figure 14:
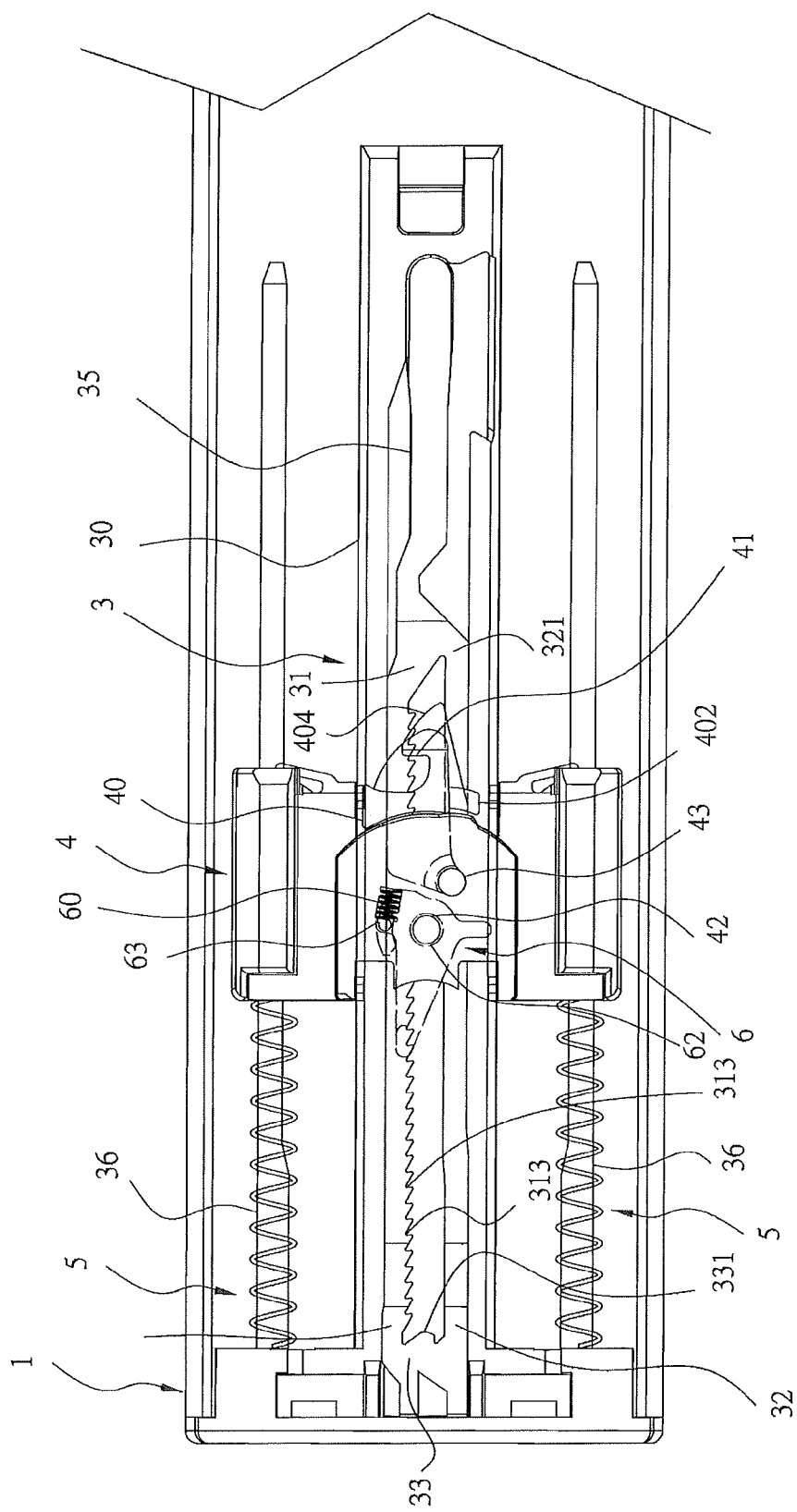
FIG. 14 is a schematic plan view, in an enlarged scale, illustrating the pawl of the locating rod of the locating member engaged with the sloping teeth at a different location.
Figure 15:
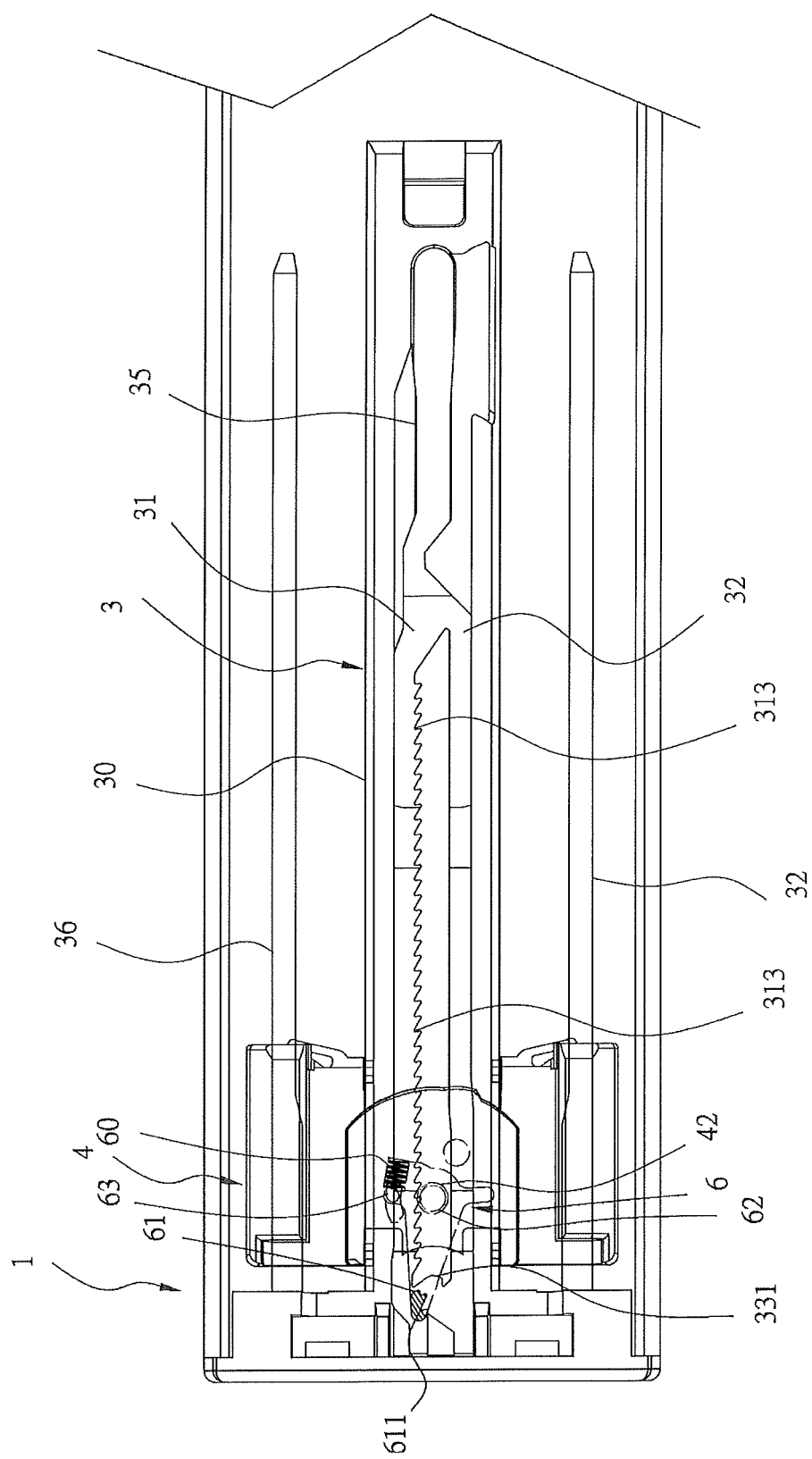
FIG. 15 is a schematic plan view, in an enlarged scale, illustrating the auto-opening mechanism carrier plate moved backward to the end (the intermediate rail, the movable rail, the first compression springs and the sliding device not shown).

Referring to FIGS. 1-20, a side-locking sliding rail assembly having an auto-opening mechanism in accordance with the present disclosure is shown. The side-locking sliding rail assembly comprises:

a fixed rail 1 (see FIGS. 6-17) configured to be affixed to an inner sidewall of a cabinet (not shown);

a movable rail 2 (see FIGS. 6-17) configured to be affixed to a drawer (not shown) and mounted on the fixed rail 1 and being slidable with the drawer forward and backward relative to the fixed rail 1;

an intermediate rail 9 (see FIGS. 6-17) coupled between the fixed rail 1 and the movable rail 2 and being slidable forward and backward relative to the fixed rail 1 and the movable rail 2;

a sliding device 4 comprising a sliding groove 45 slidably coupled to an auto-opening mechanism carrier plate 3 for enabling the sliding device 4 to be moved forward or backward along the auto-opening mechanism carrier plate 3, a first pivot hole 41 for the connection of a hook block 40 pivotally, a second pivot hole 42 for the connection of a locating member 6 pivotally (see FIG. 1, FIG. 3 and FIGS. 7-20), at least one positioning portion 44 (see FIG. 1 and FIG. 2) for the connection of one end 51 of at least one first compression spring 5 (although two first compression springs 5 are provided in the example shown), and a second compression spring positioning portion 43 (see FIG. 18 and FIG. 20) for the connection of one end 601 of a second compression spring 60;

a locating member 6 comprising a second pivot pin 62 located at a front side thereof (see FIG. 1, FIG. 3 and FIGS. 18-20) and pivotally connected to the second pivot hole 42 of the sliding device 4, a locating rod 61 located at an opposing rear side thereof (see FIG. 1 and FIG. 3) and providing a pawl 611 (see FIG. 3, FIGS. 8-18 and FIG. 20), and a support rod 63 located at the rear side for supporting an opposite end 601 of a second compression spring 60 (see FIG. 1, FIG. 3, FIG. 18 and FIG. 20) for enabling the second compression spring 60 to impart an elastic restoring force or biasing force to the pawl 611 of the locating rod 61;

a hook block 40 comprising a first pivot pin 403 (see FIG. 1, FIG. 3 and FIGS. 18-20) pivotally connected to the first pivot hole 41 of the sliding device 4, a hook portion 401, and a retaining portion 402 (see FIGS. 1-4);

an actuation member 20 (see FIGS. 7-11) mounted at one lateral side of the movable rail 2 for linking to the hook block 40 that is pivotally connected to the sliding device 4;

at least one first compression spring 5 each having one end 51 thereof connected to the positioning portion 44 of the sliding device 4 and an opposite end 52 thereof (see FIGS. 1-4) stopped against a rear end of an auto-opening mechanism carrier plate 3;

a second compression spring 60 (see FIGS. 18 and 20) providing a lower spring force than the spring force of the at least one first compression spring 5, having one end 601 thereof connected to one side 431 of the second compression spring positioning portion 43 of the sliding device 4 and an opposite end 602 thereof supported on the support rod 63 of the locating member 6; and an auto-opening mechanism carrier plate 3 (see FIGS. 1-2 and FIGS. 4-17) fixedly fastened to a bottom wall 11 of the fixed rail 1, comprising at least one guide block 30 (see FIGS. 1-5) slidably coupled with the sliding device 4, a sliding slot 35 (see FIGS. 1, 4 and 5) for guiding the hook block 40 to slide on the auto-opening mechanism carrier plate 3, a guide-in channel 31 and a guide-out channel 32 located in an inner side thereof (see FIG. 5), a retaining channel 33 having a retaining notch 331 and being connected between a rear end of the guide-in channel 31 and a rear end of the guide-out channel 32 for allowing the locating rod 61 of the locating member 6 to be guided into the guide-in channel 31 (see FIG. 7) and then positioned in the retaining notch 331 of the retaining channel 33 (see FIG. 8) or for allowing the locating rod 61 to be disengaged from the retaining notch 331 (see FIGS. 9 and 10) and then moved out of the auto-opening mechanism carrier plate 3 through an outlet 321 of the guide-out channel 32 (see FIG. 5 and FIG. 11), a longitudinal series of sloping teeth 313 (see FIG. 5, FIG. 7 and FIGS. 11-15) arranged between opposing front end 311 and rear end 312 thereof for allowing the pawl 611 (effectively having at least one complementary tooth) of the locating rod 61 of the locating member 6 to be selectively forced into engagement with at least one of the sloping teeth 313 (see FIG. 13 and FIG. 14).

Further, the second compression spring positioning portion 43 of the sliding device 4 in this embodiment is a recess (see FIGS. 18 and 20) for receiving the second compression spring 60 that has its one end 601 inserted into the recess of the second compression spring positioning portion 43 and stopped at the inner bottom wall of the recess. The support rod 63 of the locating member 6 engages the opposite end 602 of the second compression spring 60. Alternatively, the second compression spring positioning portion 43 of the sliding device 4 can be made in the form of a pin for supporting one end 601 of the second compression spring 60, the opposite end 602 of the second compression spring 60 to be supported on the support rod 63 of the locating member 6, or may be of another suitable configuration.

Figure 2:
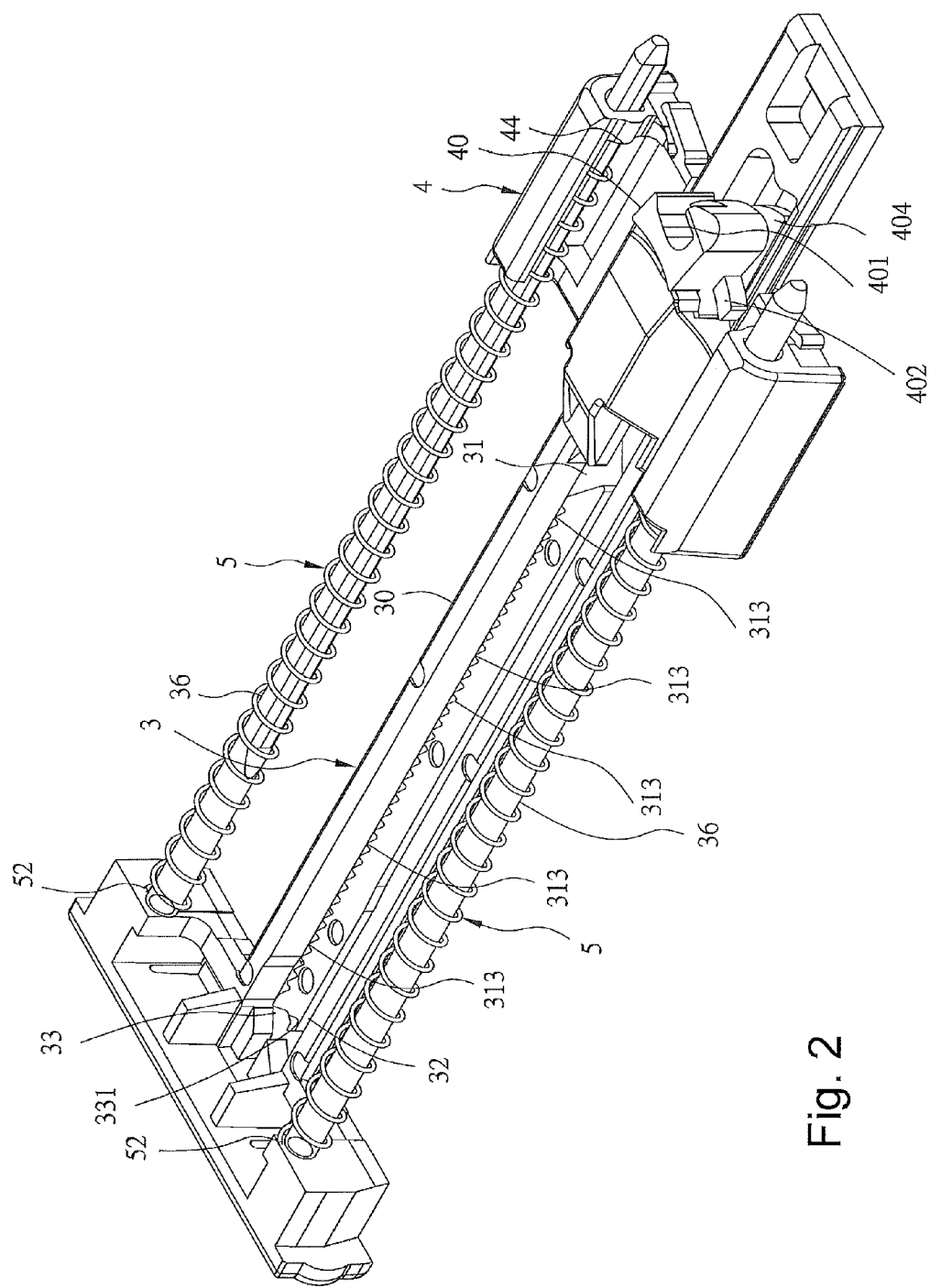
FIG. 2 is an oblique top elevational view, in an enlarged scale, of the auto-opening mechanism of the side-locking sliding rail assembly in accordance with the present disclosure.
Figure 3:
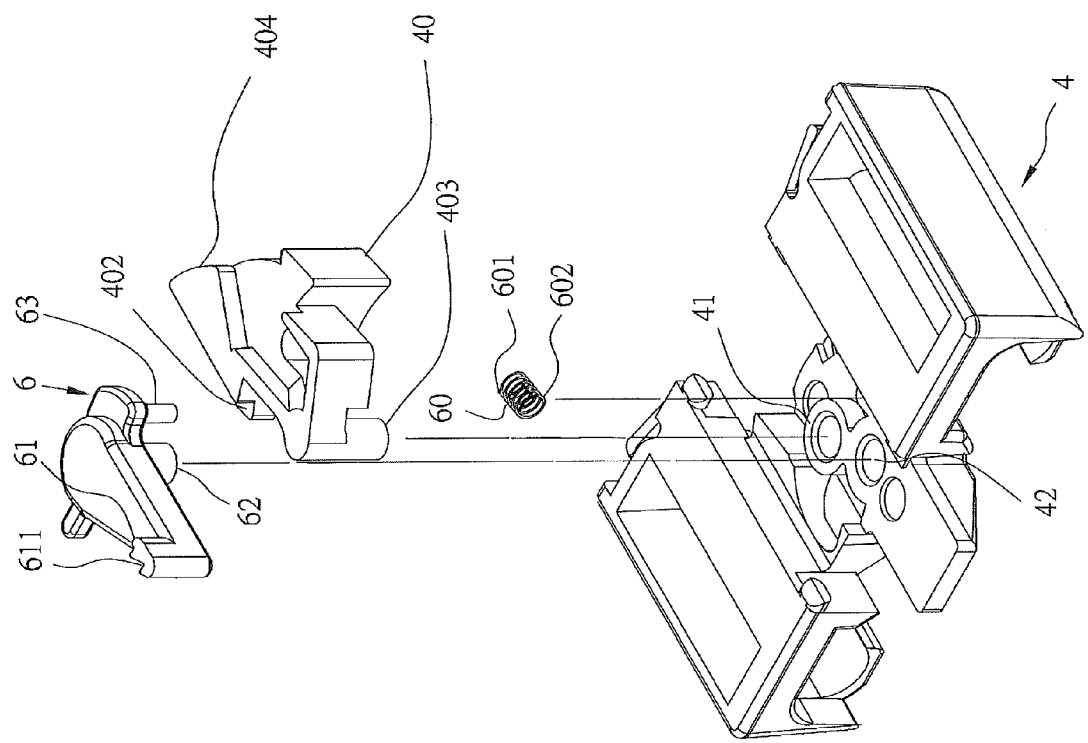
FIG. 3 is an exploded view of the sliding device, hook block, locating member and second compression spring of the auto-opening mechanism of the side-locking sliding rail assembly.
Figure 4:
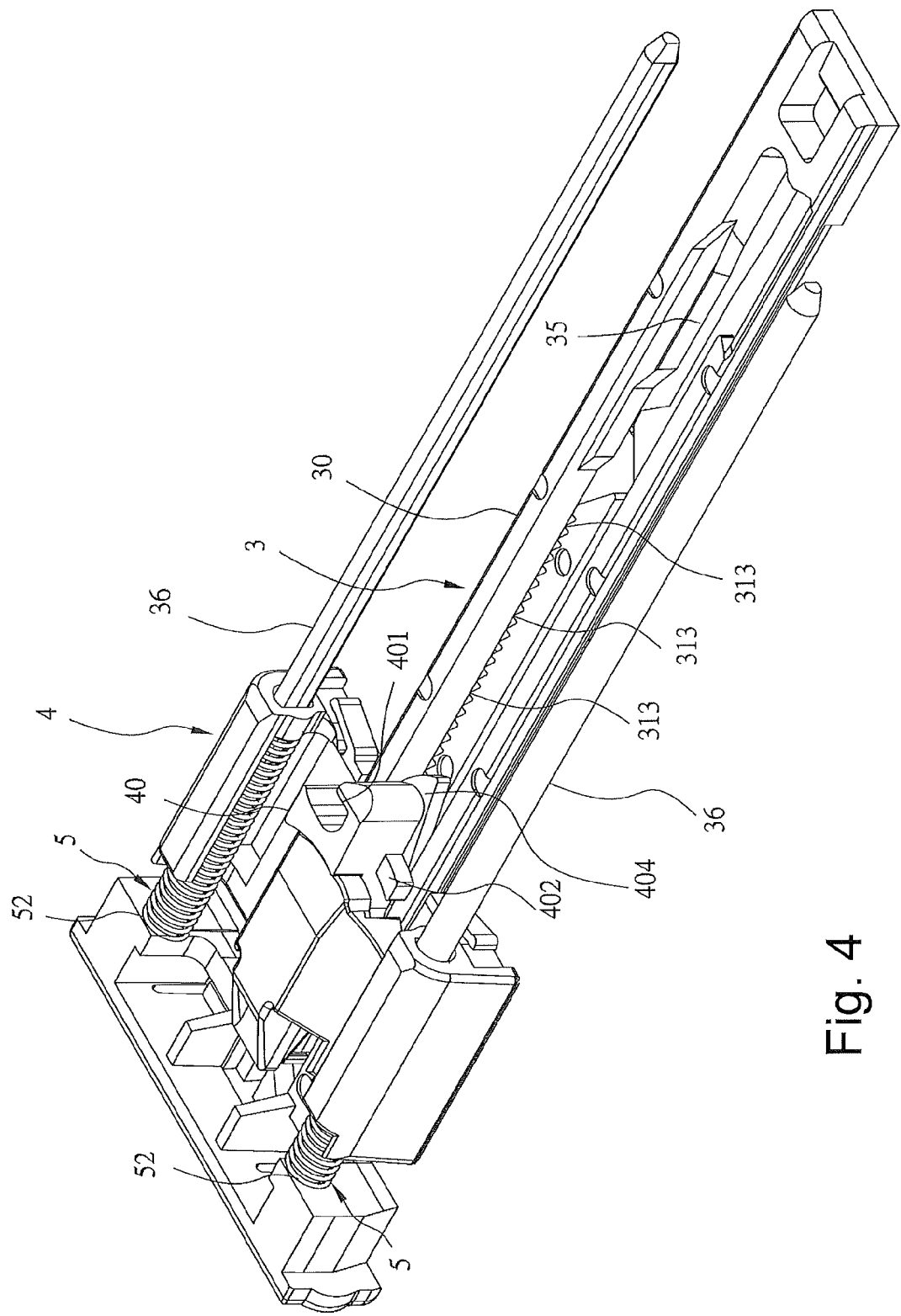
FIG. 4 is an oblique top elevational view, illustrating the first compression springs of the auto-opening mechanism in a compressed condition.
Figure 5:
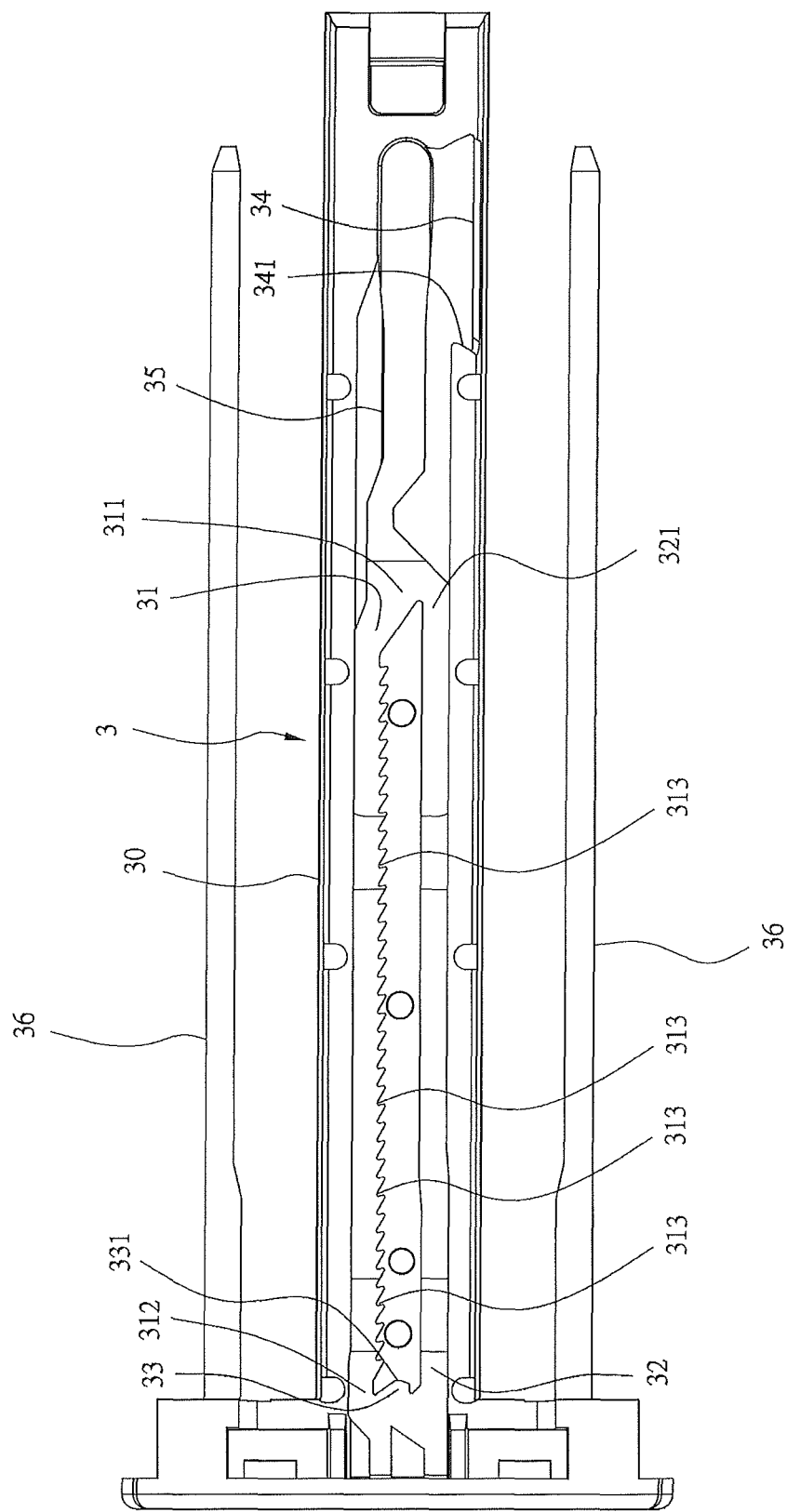
FIG. 5 is a top plan view of the auto-opening mechanism carrier plate of the auto-opening mechanism of the side-locking sliding rail assembly.
Figure 6:
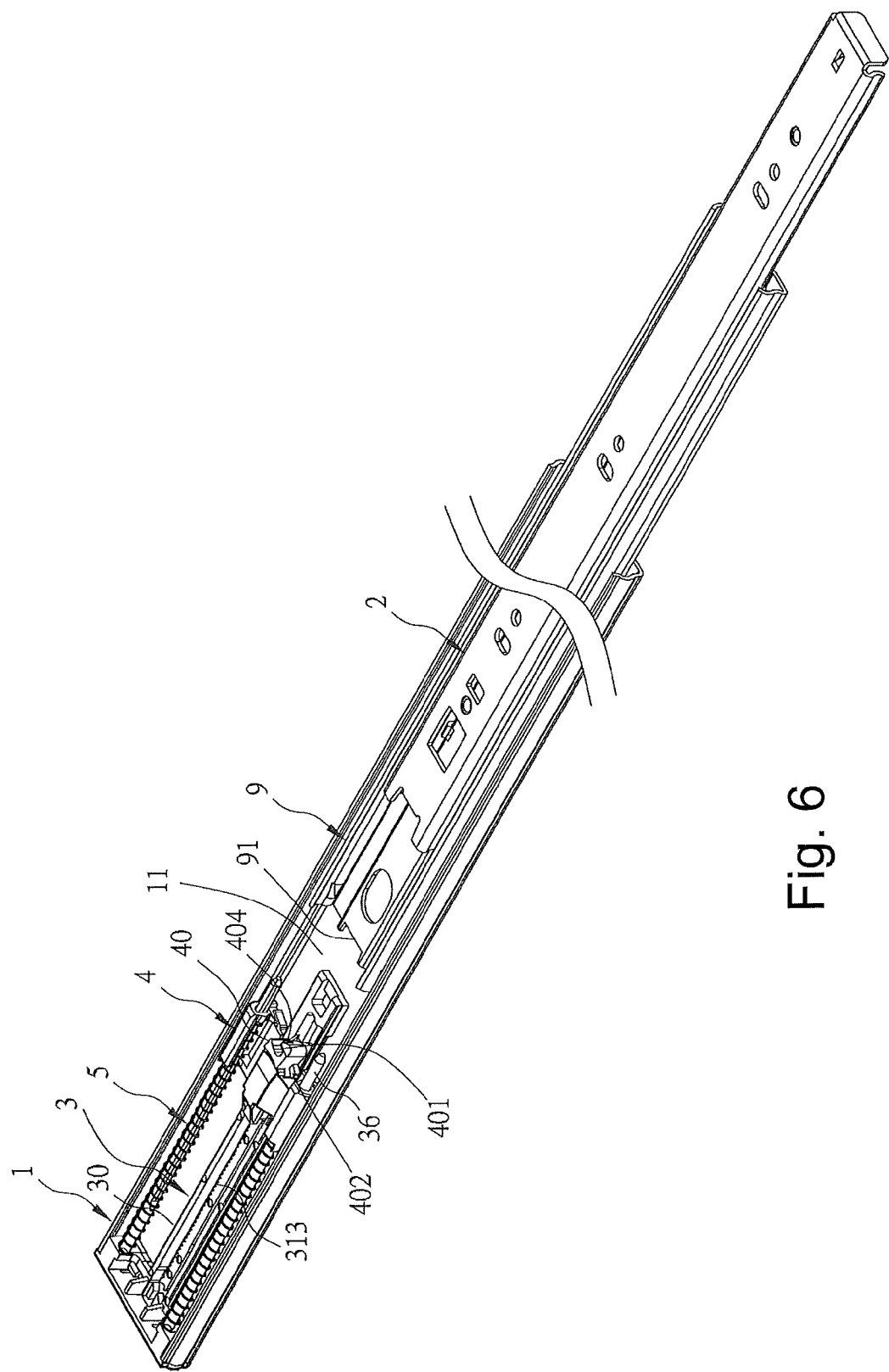
FIG. 6 is a schematic oblique top elevational view of the side-locking sliding rail assembly.
Figure 7:
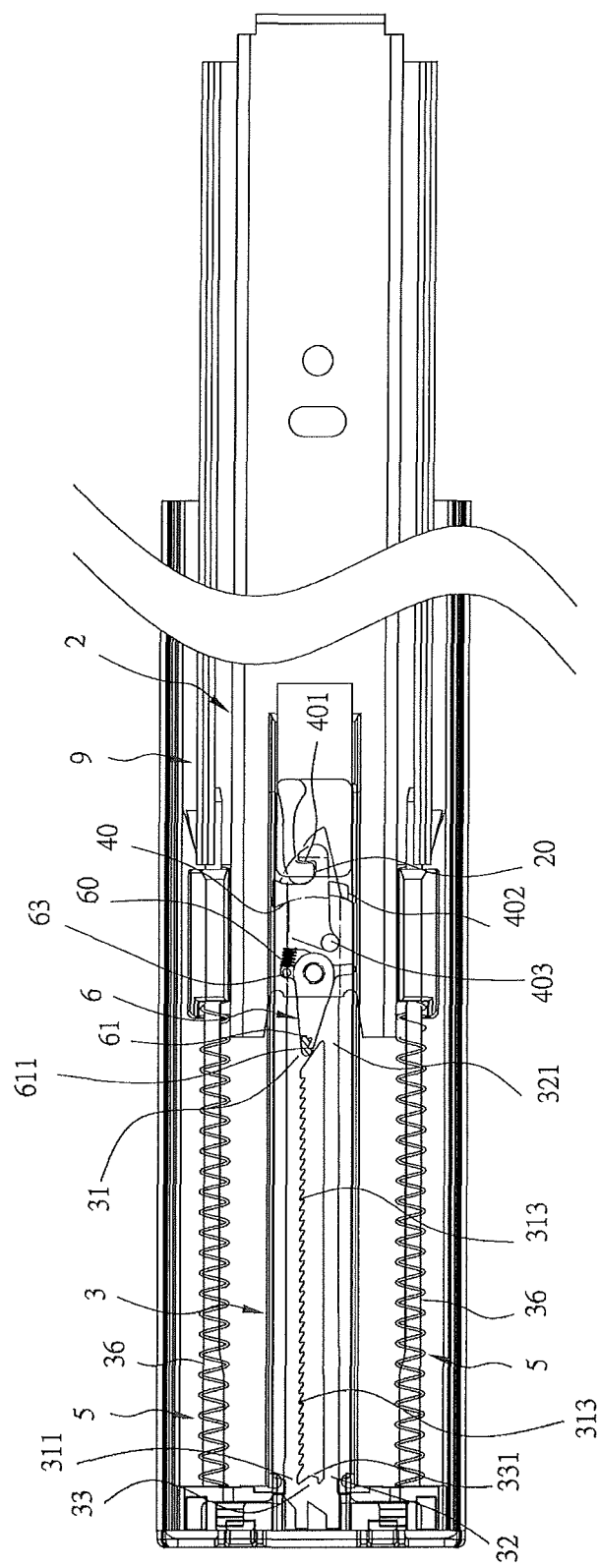
FIG. 7 is a schematic top plan, illustrating the movable rail and the intermediate rail received in the fixed rail.

The hook block 40 further comprises a restriction plate 404 that protrudes from a front side thereof (see FIGS. 1-3). When the intermediate rail 9 is moved backward (see FIG. 16) to engage the front side of the hook block 40, the restriction plate 404 will be blocked by an inner surface of the rear end 91 of the intermediate rail 9 (see FIG. 17), and the hook block 40 will not be forced to tilt as the intermediate rail 9 is being continuously forced backward.

Figure 8:
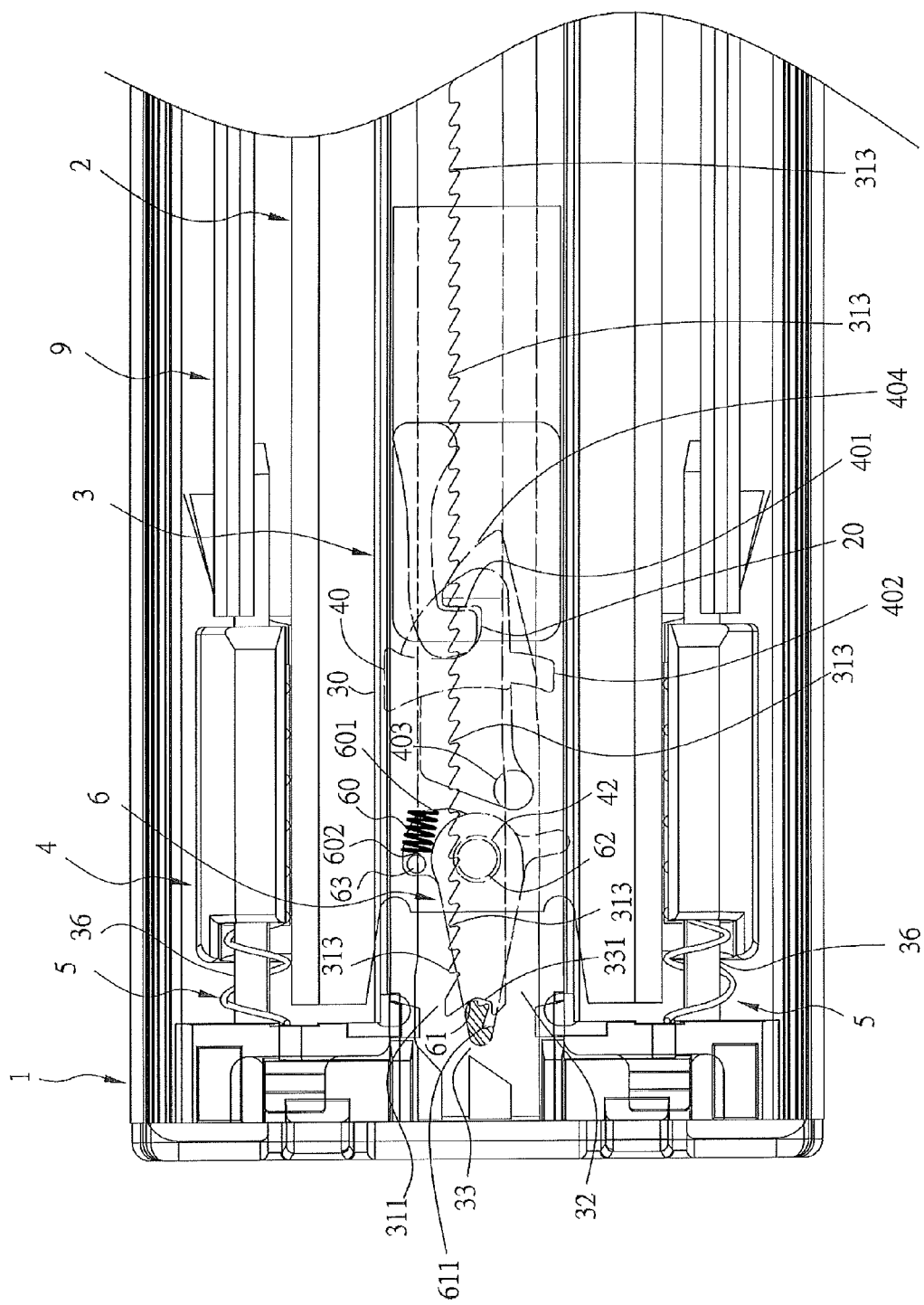
FIG. 8 is a schematic plan view, in an enlarged scale, illustrating the locating rod of the locating member guided into the retaining channel.
Figure 9:
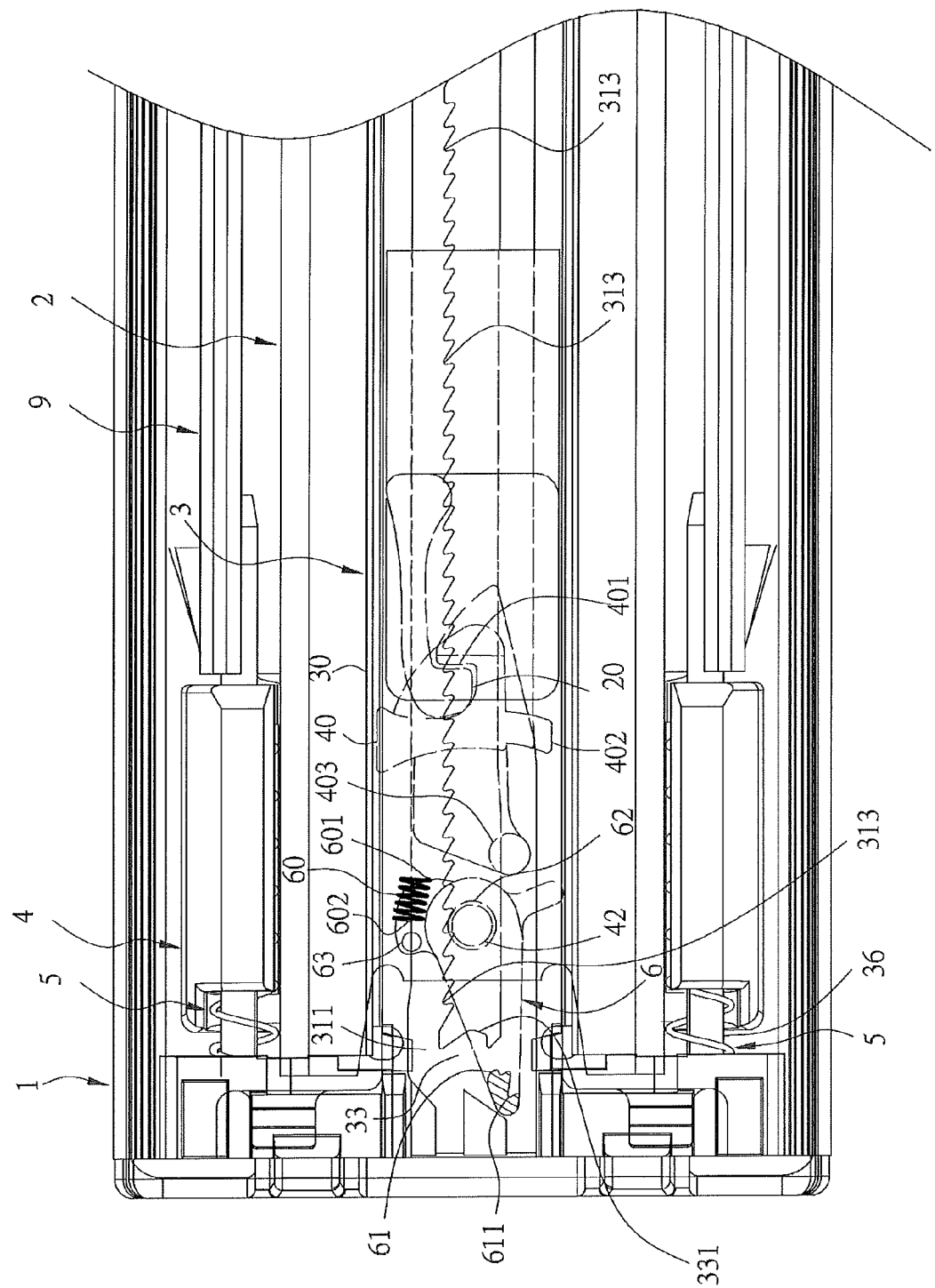
FIG. 9 is a schematic plan view, in an enlarged scale, illustrating the locating rod of the locating member disengaged from the retaining channel.
Figure 10:
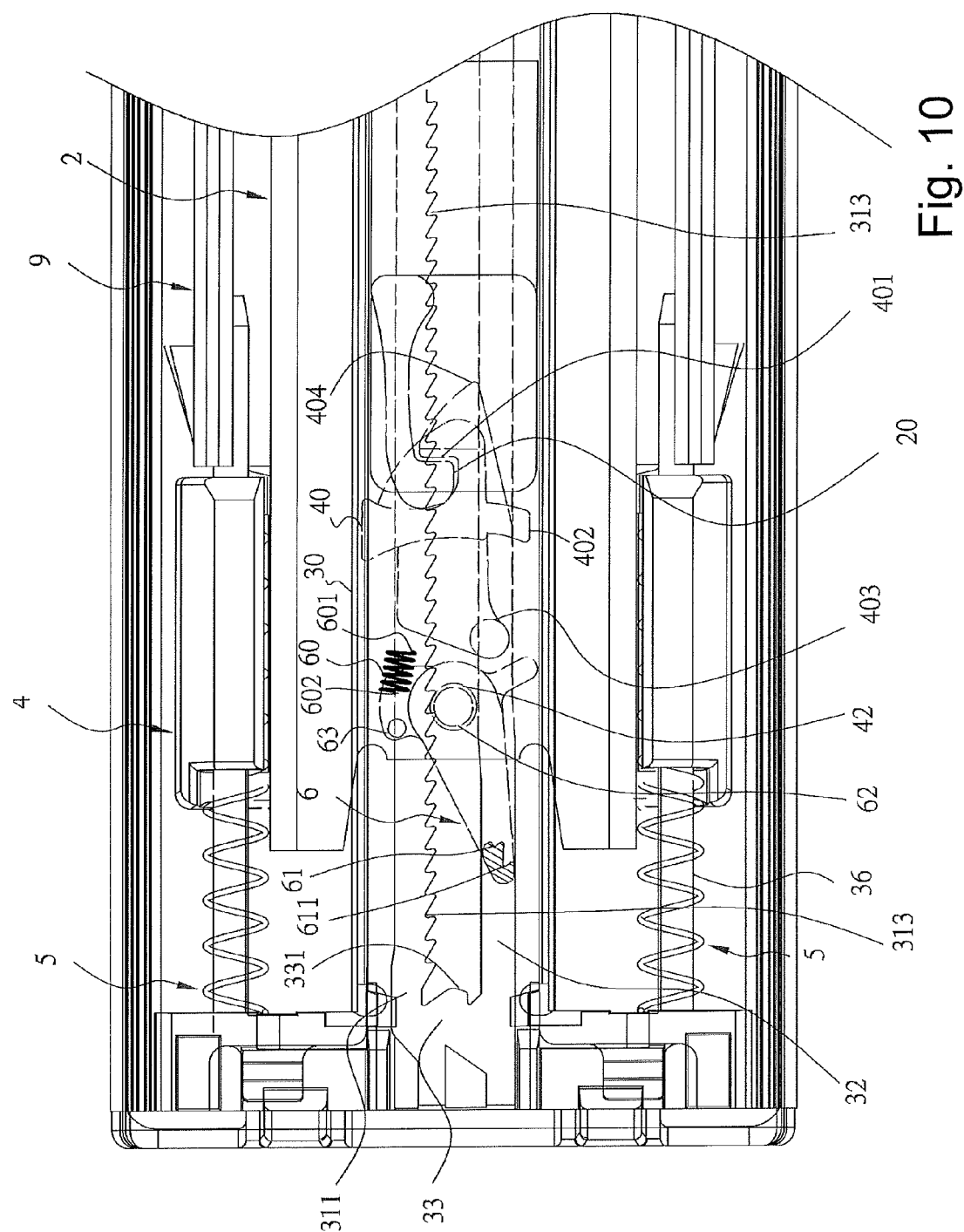
FIG. 10 is a schematic plan view, in an enlarged scale, illustrating the locating rod of the locating member disengaged from the retaining channel and guided toward the outside of the guide-out channel.
Figure 11:
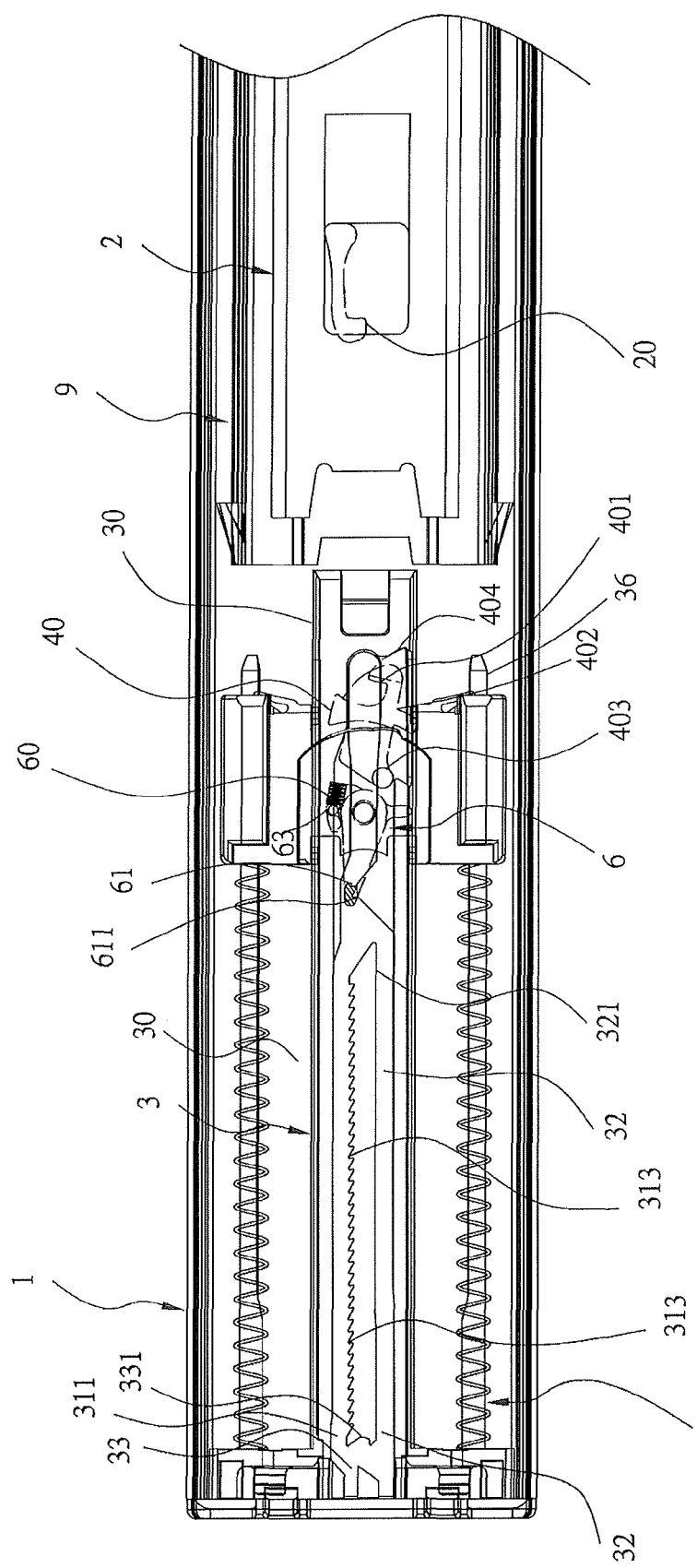
FIG. 11 is a schematic plan view, in an enlarged scale, illustrating the locating rod of the locating member completely moved out of the guide-out channel.

When the drawer (not shown) is closed, the actuation member 20 of the movable rail 2 is engaged with the hook portion 401 of the hook block 40 that is pivotally connected to the sliding device 4 (see FIG. 8), and the locating rod 61 of the locating member 6 is engaged in the retaining notch 331 of the retaining channel 33 of the auto-opening mechanism carrier plate 3 (see FIG. 8). When the drawer thereafter is pushed backward, the actuation member 20 of the movable rail 2 is forced to move the hook portion 401 of the hook block 40 backward, causing the hook block 40 and the sliding device 4 to slide backward. At this time, the locating rod 61 of the locating member 6 becomes disconnected from the retaining groove 331 of the retaining channel 33 of the auto-opening mechanism carrier plate 3 (see FIG. 9) and moved to the guide-out channel 32 (see FIG. 10) and then out of the outlet 321 of the guide-out channel 32 at a distance from the sliding device 4 (see FIG. 11). During this movement, the sliding device 4 is forced forward by the elastic restoring energy of the at least one first compression spring 5 to move the hook block 40 along the auto-opening mechanism carrier plate 3 until the hook block 40 is guided to be biased by the sliding slot 35 of the auto-opening mechanism carrier plate 3. When the hook block 40 is forced to bias or tilt, the actuation member 20 of the movable rail 2 becomes disconnected from the hook portion 401 of the hook block 40 (see FIGS. 11 and 16), allowing the movable rail 2 and the drawer to move forward to the open position, and thus the auto-opening operation is done.

At the time the sliding device 4 is moved forward by the elastic restoring energy of the at least one first compression spring 5, the locating rod 61 of the locating member 6 reaches the front end of the guide-in channel 31 of the auto-opening mechanism carrier plate 3 (see FIG. 11) and then would be subject to backward guidance of the guide-out channel 32 of the auto-opening mechanism carrier plate 3. Further, when the drawer is pushed backward to the closed position, the actuation member 20 of the movable rail 2 pushes the hook portion 401 of the hook block 40, causing the hook block 40 to bias or tilt and the locking rod 61 to move into the guide-in channel 31, and thus the hook block 40 and the sliding device 4 can be moved backward to compress the at least one first compression spring 5. As the at least one first compression spring 5 is being compressed, the locating rod 61 of the locating member 6 is guided through the guide-in channel 31 of the auto-opening mechanism carrier plate 3, and then positioned in the retaining notch 331 of the retaining channel 33 (see FIG. 8) to be locked in position relative to the auto-opening mechanism carrier plate 3, and thus, the drawer is kept in the closed position and is ready for a next auto-opening operation. Further, if the locating rod 61 of the locating member 6 is not accurately guided through the guide-in channel 31 into the retaining notch 331 of the retaining channel 33 when the user pushes the drawer from the open position toward the closed position, the drawer will not be ejected out by the elastic restoring energy of the at least one first compression spring 5, because the pawl 611 of the locating rod 61 of the locating member 6 will be forced into engagement with at least one sloping tooth 313 of the longitudinal series of sloping teeth 313 of the auto-opening mechanism carrier plate 3 (see FIGS. 13 and 14). At this time, the user can gently apply a pressure to push the drawer further backward to the closed position, thereby moving the locating rod 61 of the locating member 6 into engagement with the retaining notch 331 of the retaining channel 33 (see FIG. 8), achieving the closing operation.

As indicated above, the invention provides the following advantageous features.

If the drawer does not reach the closed position when the user pushes the drawer backward from the open position to the closed position, the pawl 611 of the locating rod 61 of the locating member 6 will be forced by the second compression spring 60 into engagement with at least one of the series of sloping teeth 313 (FIG. 12 illustrates the positioning of the pawl 611 before engagement; FIGS. 13 and 14 illustrate the pawl 611 engaged with the series of sloping teeth 313 at different locations, such as retained in FIG. 14) to prohibit the drawer from being forced outward by the elastic potential energy of the at least one first compression spring 5, and the drawer still can be accurately closed if the user gently applies a pressure to push the drawer further backward to the closed position, assuring positive auto-opening functioning. The arrangement of a second compression spring 60 and the small tooth pitch design of the sloping teeth 313 of the auto-opening mechanism carrier plate 3 prevent component damage upon impact between the locating rod 61 of the locating member 6 and the auto-opening mechanism carrier plate 3.

If the sliding device 4 slides backward relative to the auto-opening mechanism carrier plate 3 when the user closes the drawer (see FIG. 15), even if the pawl 611 of the locating rod 61 of the locating member 6 is disengaged from the sloping teeth 313 of the auto-opening mechanism carrier plate 3, the second compression spring 60 still can effectively prohibit the locating member 6 from tilting back into the guide-in channel 31. In other words, the locating rod 61 of the locating member 6 will not be forced back toward the outer wall of the guide-in channel 31 and fall downward due to a large dimensional tolerance of the second pivot pin 62 of the locating member 6 or insufficient damping oil, as may occur with the prior art. Under normal operation, when the locating rod 61 slides backward in the auto-opening mechanism carrier plate 3 to the full extent, the elastic restoring energy of the at least one first compression spring 5 will force the locating rod 61 forwardly into the retaining notch 33 in the retaining channel 331 (see FIG. 8), assuring a fully closed position and being ready for positive auto-opening functioning.

Figure 16:
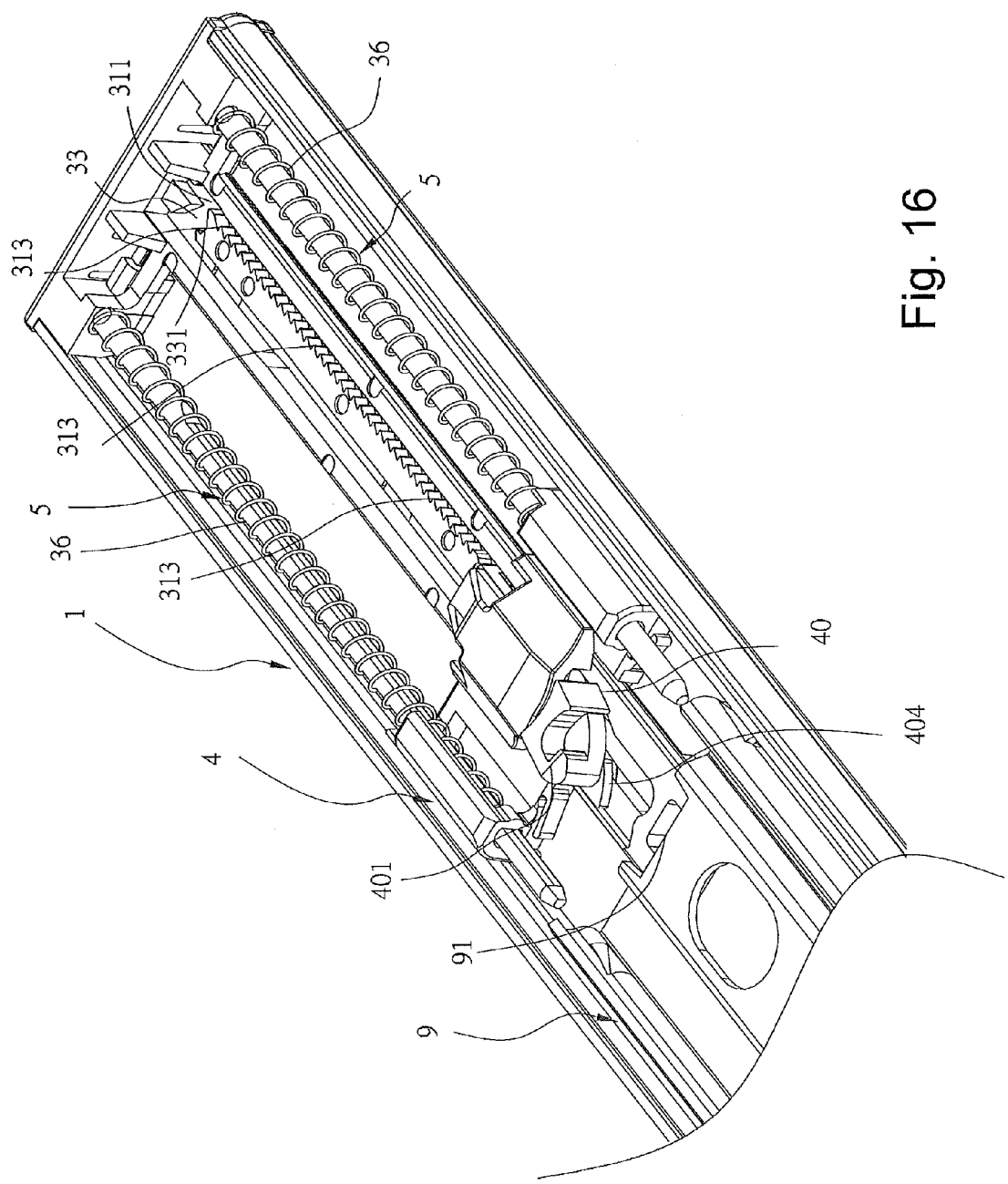
FIG. 16 is a schematic oblique perspective view, in an enlarged scale, illustrating the intermediate rail moved backward before contact with the hook block.
Figure 17:
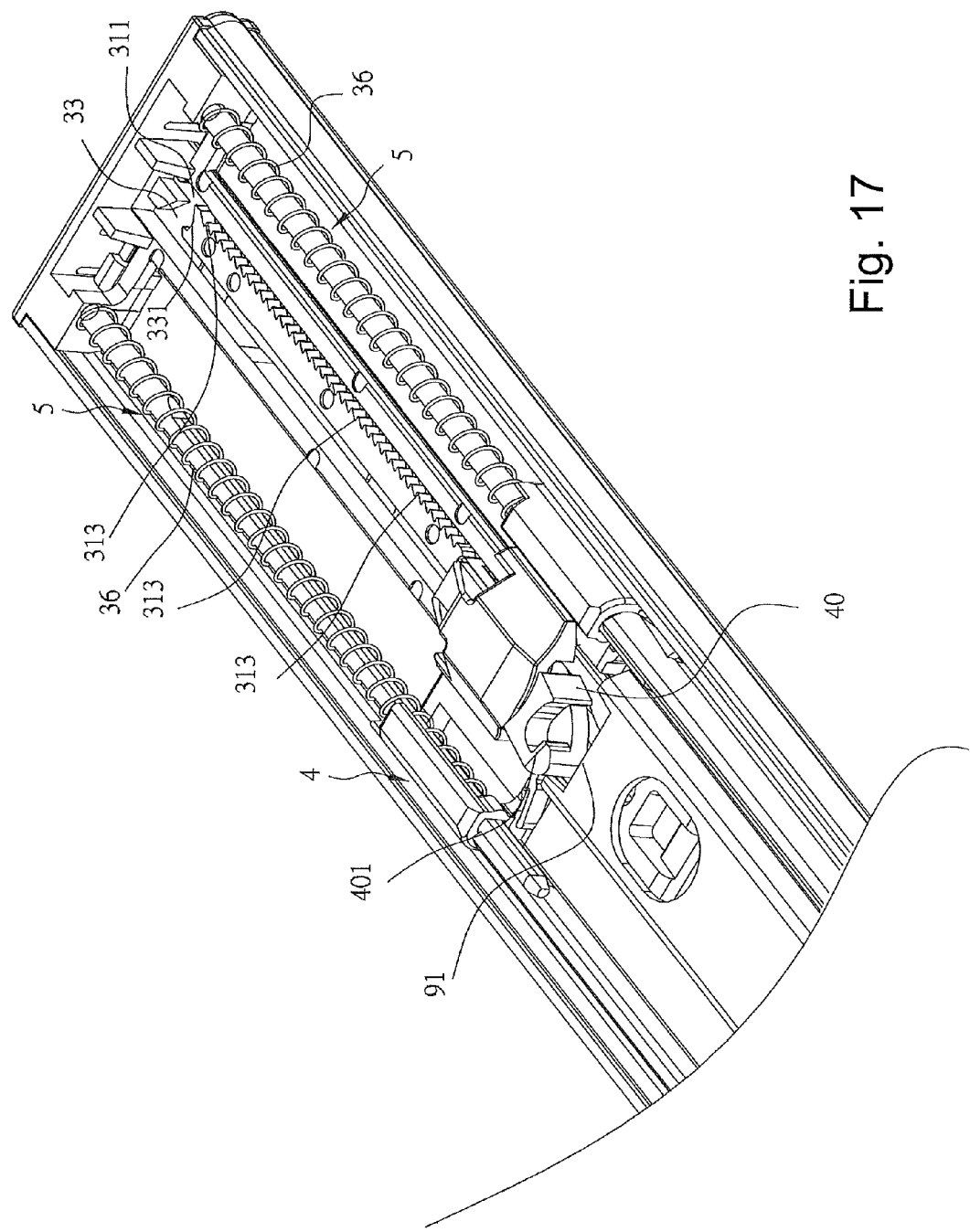
FIG. 17 is a schematic oblique perspective view, in an enlarged scale, illustrating the intermediate rail moved backward, and the inner surface of the rear end of the intermediate rail blocked by the restriction plate of the hook block.
Figure 18:
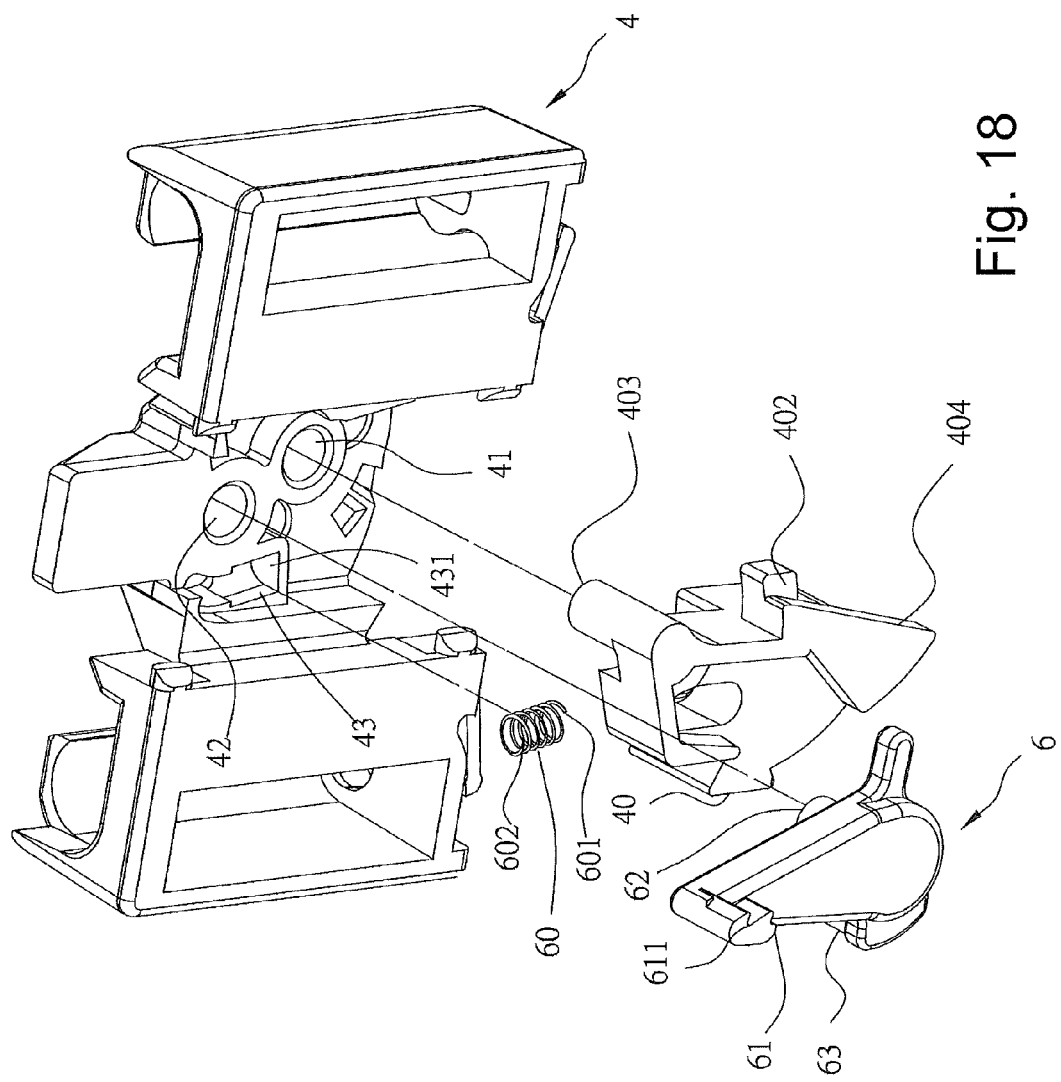
FIG. 18 is an exploded view of the sliding device, hook block, locating member and second compression spring of the auto-opening mechanism of the side-locking sliding rail assembly.
Figure 19:
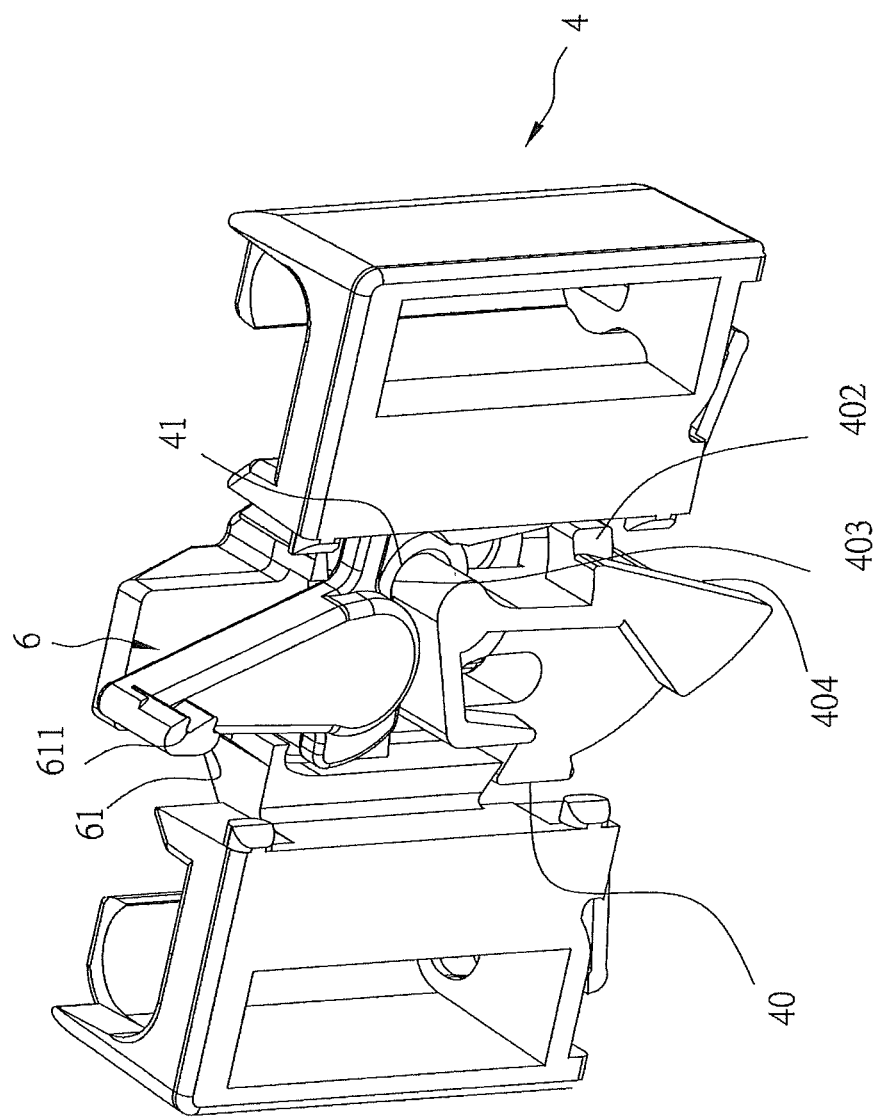
FIG. 19 is an oblique elevational assembly view of the component parts shown in FIG. 18.
Figure 20:
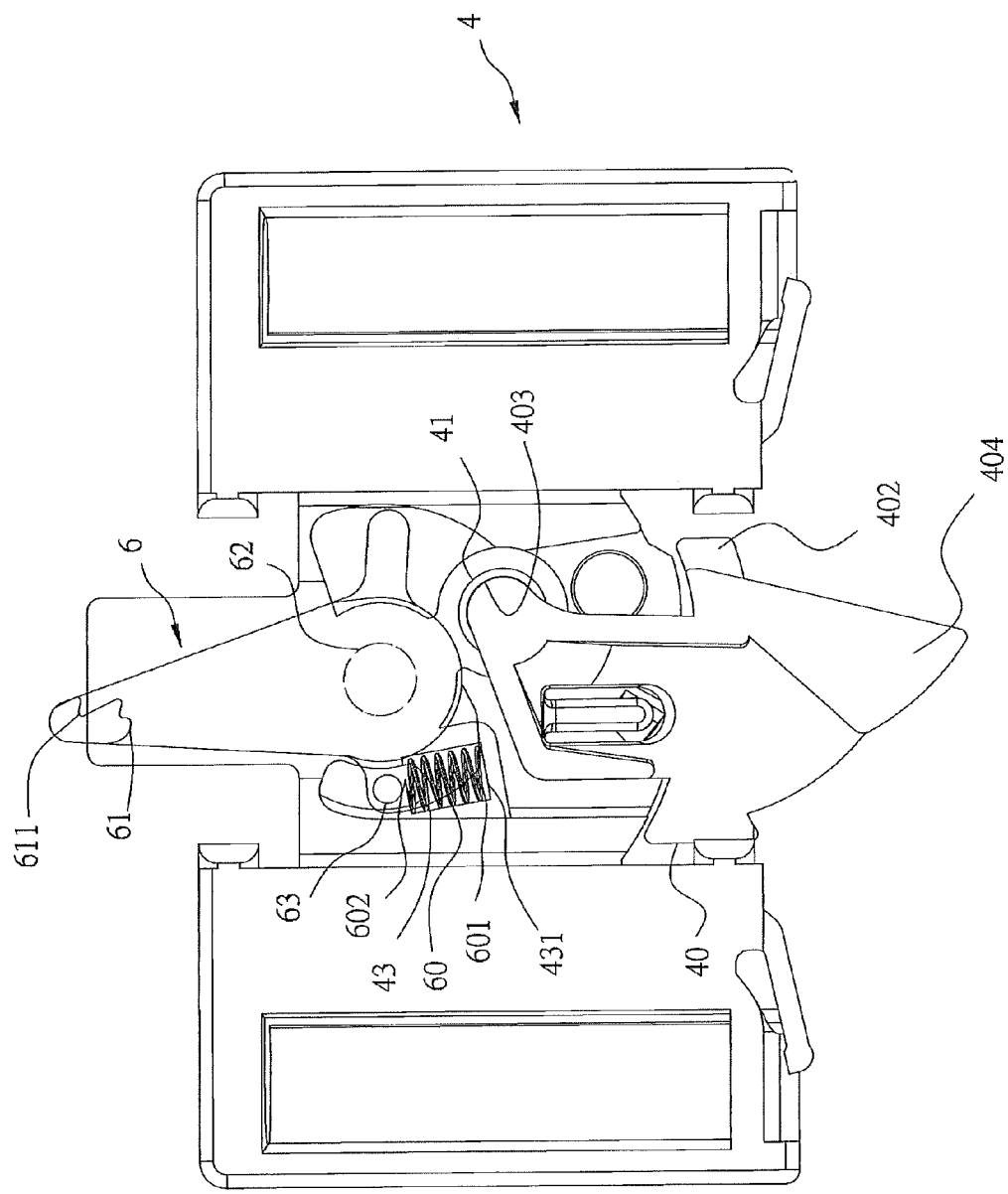
FIG. 20 is a bottom view of the assembly shown in FIG. 19.

The hook block 40 also has a restriction plate 404 that protrudes from a front side thereof (see FIG. 16). When the intermediate rail 9 is moved backward to engage the front side of the hook block 40, the restriction plate 404 will be blocked by an inner surface of the rear end 91 of the intermediate rail 9 (see FIG. 17), and the hook block 40 will not be forced to bias or to tilt as the intermediate rail 9 is being continuously forced backward.

The invention claimed is:

1. A side-locking sliding rail assembly, comprising:
a fixed rail configured to be affixed to an inner sidewall of a cabinet;
a movable rail configured to be affixed to a drawer and mounted on said fixed rail and slidable with said drawer forward and backward relative to said fixed rail;
an intermediate rail coupled between said fixed rail and said movable rail and slidable forward and backward relative to said fixed rail and said movable rail;
a sliding device, a locating member, a hook block, an actuation member, at least one first compression spring, a second compression spring, and an auto-opening mechanism carrier plate;
said sliding device comprising a sliding groove slidably coupled to said auto-opening mechanism carrier plate enabling said sliding device to be moved forward or backward along the auto-opening mechanism carrier plate, a first pivot hole for pivotal connection of said hook block, a second pivot hole for pivotal connection of said locating member, at least one positioning portion for connection of one end of said at least one first compression spring, and a second compression spring positioning portion for connection of one end of said second compression spring;
said locating member comprising a second pivot pin located at a front side of said locating member and being pivotally connected to said second pivot hole of said sliding device, a locating rod located at an opposing rear side of said locating member and having a pawl, and a support rod located at a rear side of said locating member and that supports an opposite end of said second compression spring and enables the second compression spring to impart an elastic restoring force to said pawl of said locating rod;
said hook block comprising a first pivot pin pivotally connected to said first pivot hole of said sliding device, a hook portion, and a retaining portion;
said actuation member mounted at one lateral side of said movable rail for linking to said hook block;
said at least one first compression spring having one end thereof connected to said positioning portion of said sliding device and an opposite end thereof stopped against a rear end of said auto-opening mechanism carrier plate;
said second compression spring having one end thereof connected to one side of said second compression spring positioning portion of said sliding device and an opposite end thereof supported on said support rod of said locating member; and
said auto-opening mechanism carrier plate is fixedly fastened to a bottom wall of said fixed rail, said auto-opening mechanism carrier plate comprising at least one guide block slidably coupled with said sliding device, a sliding slot for guiding said hook block to slide on said auto-opening mechanism carrier plate, a guide-in channel and a guide-out channel located within said auto-opening mechanism carrier plate, a retaining channel having a retaining notch and being connected between a rear end of said guide-in channel and a rear end of said guide-out channel for allowing said locating rod of said locating member to be guided into said guide-in channel and then positioned in said retaining notch of said retaining channel or for allowing said locating rod to be disengaged from said retaining notch and then moved out of said auto-opening mechanism carrier plate through an outlet of said guide-out channel, a longitudinal series of sloping teeth arranged between opposing front and rear ends of the guide-in channel for allowing said pawl of said locating rod of said locating member to be selectively forced into engagement with at least one sloping tooth of said series of sloping teeth.

2. The side-locking sliding rail assembly as claimed in claim 1, wherein said second compression spring positioning portion of said sliding device engages one end of said second compression spring and said support rod of said locating member engages an opposite end of said second compression spring.

3. The side-locking sliding rail assembly as claimed in claim 1, wherein said second compression spring positioning portion of said sliding device is a recess that receives said second compression spring and said one end of said second compression spring engages an inner bottom wall of the recess.

4. The side-locking sliding rail assembly as claimed in claim 1, wherein said hook block further comprises a restriction plate that protrudes from a front side of said hook block and is blocked by an inner surface of a rear end of said intermediate rail when said intermediate rail is moved backward to engage a front side of said hook block.

5. The side-locking sliding rail assembly as claimed in claim 1, wherein said at least one compression spring provides an elastic restoring energy spring force when compressed and said second compression spring provides a lower restoring spring force than said elastic restoring energy spring force of said at least one first compression spring.

* * * * *